(12) United States Patent
Bosen

(10) Patent No.: US 7,964,982 B2
(45) Date of Patent: Jun. 21, 2011

(54) AXIAL IN-LINE TURBOMACHINE

(75) Inventor: Werner Bosen, Köln (DE)

(73) Assignee: Atlas Copco Energas GmbH, Cologne (DE)

( * ) Notice: Subject to any disclaimer, the term of this patent is extended or adjusted under 35 U.S.C. 154(b) by 373 days.

(21) Appl. No.: 12/171,389

(22) Filed: Jul. 11, 2008

(65) Prior Publication Data

US 2009/0015012 A1 Jan. 15, 2009

(30) Foreign Application Priority Data

Jul. 14, 2007 (DE) .......................... 10 2007 032 933

(51) Int. Cl.
*F01D 25/16* (2006.01)
(52) U.S. Cl. ....................................................... 290/52
(58) Field of Classification Search ..................... 290/52; 310/90.5
See application file for complete search history.

(56) References Cited

U.S. PATENT DOCUMENTS

| | | | | |
|---|---|---|---|---|
| 5,083,040 A | * | 1/1992 | Whitford et al. ................ | 290/52 |
| 5,248,239 A | * | 9/1993 | Andrews ........................ | 415/104 |
| 5,285,123 A | * | 2/1994 | Kataoka et al. ................. | 310/88 |
| 5,481,145 A | * | 1/1996 | Canders et al. ............... | 310/90.5 |
| 5,628,191 A | * | 5/1997 | Kueck et al. .................... | 60/655 |
| 6,608,418 B2 | * | 8/2003 | Andres et al. ................ | 310/90.5 |
| 6,616,423 B2 | * | 9/2003 | Bosen ........................... | 417/365 |
| 7,638,892 B2 | * | 12/2009 | Myers ............................. | 290/52 |
| 2004/0088976 A1 | * | 5/2004 | Jaisle .............................. | 60/602 |
| 2008/0252077 A1 | * | 10/2008 | Myers ............................. | 290/52 |
| 2010/0237619 A1 | * | 9/2010 | Pozivil et al. ................... | 290/52 |

FOREIGN PATENT DOCUMENTS

| | | | | |
|---|---|---|---|---|
| EP | 2017435 A2 | * | 1/2009 | |
| JP | 63277443 A | * | 11/1988 | |
| JP | 2007097314 A | * | 4/2007 | |
| JP | 2009019632 A | * | 1/2009 | |

* cited by examiner

*Primary Examiner* — Joseph Waks
(74) *Attorney, Agent, or Firm* — Andrew Wilford

(57) ABSTRACT

A turbomachine has a housing defining an axis and having an axially outwardly directed first end wall. A shaft rotatable about the axis inside the housing has a first end projecting axially from the housing. An electric rotor is provided on the shaft, and an electric stator is provided on the housing juxtaposed with the electric rotor. A radial impeller fixed on the first shaft end outside the housing has an inner face directed axially toward the housing end wall. A magnetic bearing half is fixed on the housing end wall immediately adjacent and directed at the impeller inner face.

11 Claims, 1 Drawing Sheet

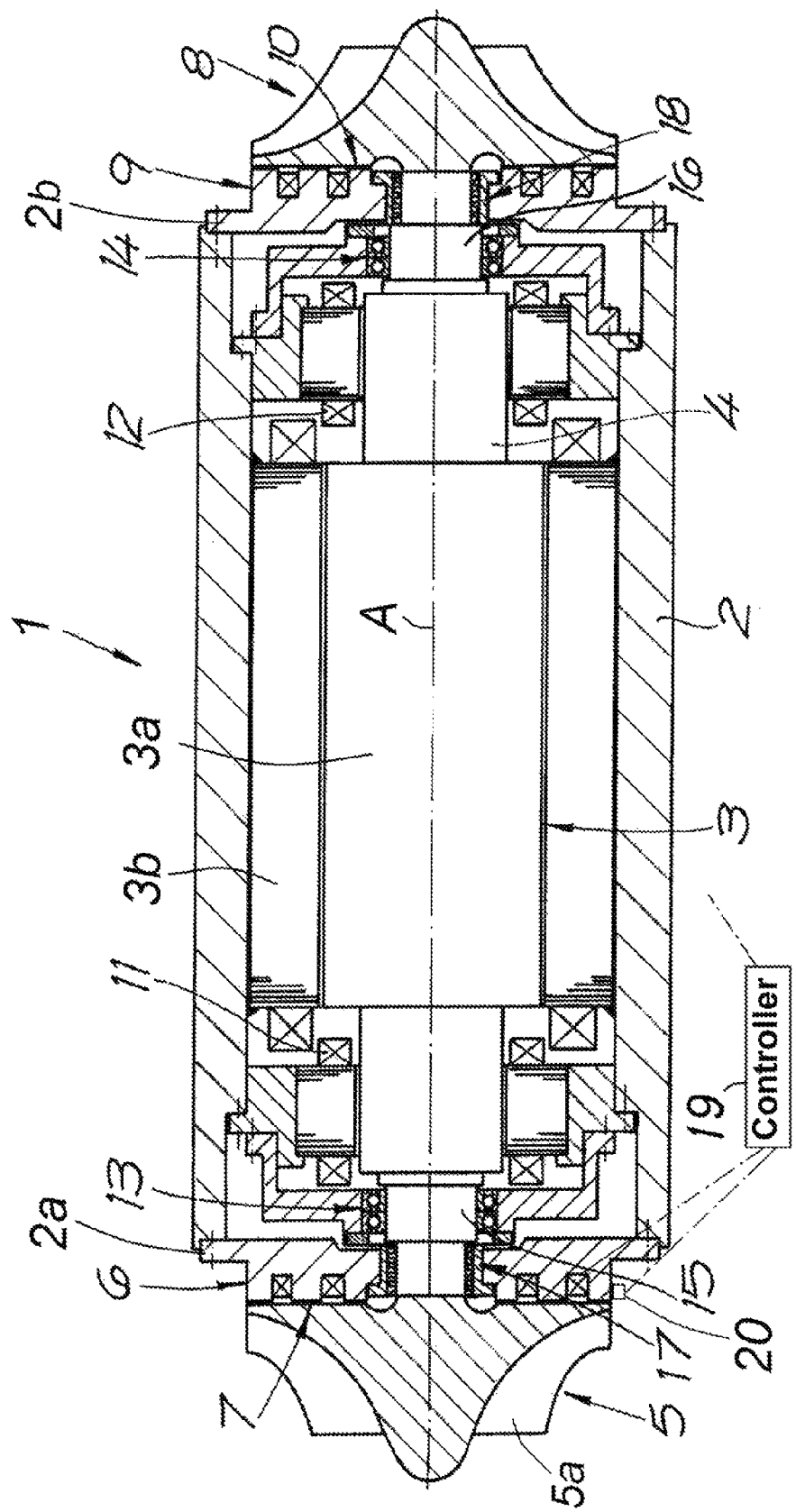

AXIAL IN-LINE TURBOMACHINE

FIELD OF THE INVENTION

The present invention relates to a turbomachine. More particularly this invention concerns such a machine that can act as a pump, turbine, or compressor.

BACKGROUND OF THE INVENTION

A turbomachine transfers energy between a rotor and a fluid. The turbomachine according to the invention includes electromagnetic parts that allow it to operate when supplied electricity as a pump or compressor, or when driven by passing fluid as a generator.

In practice, turbomachines having an axially, magnetically supported rotor shaft are known where for axial support the magnetic bearing halves are associated with an axial bearing disk or oppositely situated shaft shoulders that are shrunk onto the rotor shaft. Combination magnetic bearing designs are also known in which the two axial magnetic bearing halves are mounted on one end of the rotor shaft on the two side surfaces of a rotating multidisk assembly located on the rotor shaft, and the side edges of the multidisk assembly are enclosed by a radial magnetic bearing, the opposite end of the rotor shaft likewise being also supported on a radial magnetic bearing.

Also known in practice are turbomachines having the above-described features, and whose rotor shaft is supported on an active magnetic bearing mounted on the end of the rotor shaft axially outside the radial impeller. Active magnetic bearings require a continuous power supply, as well as so-called backup bearings for protecting the bearing in the event of a power failure. Such backup bearings are typically mechanical, radial, and axial emergency ball bearings that support the rotor shaft when at rest or in the event of a failure of the magnetic bearing.

Since for the known active magnetic bearings the required magnetic field is generated by use of electromagnets, the magnetic field and thus the acting bearing force may be modified by varying the current in the coils of the electromagnets. Therefore, to allow support of a rotor shaft on an active magnetic bearing, feedback control is necessary in order to adjust the corresponding bearing force. Such turbomachines may be operated at very high rotational speeds when using a magnetic bearing for the rotor shaft. However, the bending-critical natural frequencies of the rotor shaft at high operating speeds are in the vicinity of or below the maximum continuous operating frequency of the turbomachine. This makes stable, active regulation of the magnetic bearings very complicated or even impossible.

Operation of the turbomachine in a state in which frequencies may arise that are in the range of bending-critical natural frequencies of the rotor shaft is essentially precluded by means of two preventative measures. First, the permissible operating speeds have already been reduced in the design of the turbomachine. For a given output and demand on the turbomachine this measure results in the construction of larger turbomachines whose compressor or expander stages, which are designed below the optimal rotational speed, also have reduced efficiency compared to optimum. Second, an additional axial bearing disk may be omitted. In this manner the mass of the rotor shaft may be reduced, since the rotor shaft may be shortened by the length of the shaft segment for the additional axial bearing disk, thereby increasing the bending-critical natural frequencies of the rotor shaft. The axial magnetic bearing halves engage on much smaller shaft shoulders or on rotating multidisk assemblies shrunk onto the rotor shaft when the axial bearing disk is omitted, but this results in an undesired reduction in the axial bearing forces.

OBJECTS OF THE INVENTION

It is therefore an object of the present invention to provide an improved axial in-line turbomachine.

Another object is the provision of such an improved axial in-line turbomachine that overcomes the above-given disadvantages, in particular that has a short rotor shaft and a small rotor mass to allow the bending-critical natural frequencies of the rotor and thus the operating speed of the turbomachine to be increased, and that also has axial magnetic bearings of adequate dimensions for absorbing the often high static and dynamic pressure and axial pulse thrusts of the radial impeller.

SUMMARY OF THE INVENTION

A turbomachine has according to the invention a housing defining an axis and having an axially outwardly directed first end wall. A shaft rotatable about the axis inside the housing has a first end projecting axially from the housing. An electric rotor is provided on the shaft, and an electric stator is provided on the housing juxtaposed with the electric rotor. A radial impeller fixed on the first shaft end outside the housing has an inner face directed axially toward the housing end wall. A magnetic bearing half is fixed on the housing end wall immediately adjacent and directed at the impeller inner face.

The basic design of the turbomachine according to the invention thus includes a housing, an electric machine, and a rotor shaft supported in the housing. The rotor of the electric machine is mounted on the rotor shaft. A radial impeller is also mounted with one-sided support on at least one end of the rotor shaft. For axial support of the rotor shaft, an axial magnetic bearing half that acts on an inner face of the radial impeller is mounted on at least one end of the rotor shaft at the impeller-side end wall of the housing.

Magnetic bearings function without oil lubrication and have generally proven to be wear-free. Magnetic bearings also allow maximum rotational speeds with very low losses and a high level of operating smoothness, thereby ensuring an overall economically favorable and hermetically sealed operation. For this reason, the rotor shaft for the turbomachine according to the invention is preferably also radially supported on magnetic bearings.

In one preferred design of the invention, radial impellers are mounted with one-sided support on both ends of the rotor shaft, that is there is no structure carried by the rotors radially outside the impellers and, in fact, the rotor shaft terminates inside the impellers that are fitted like caps to it. In addition, likewise mounted on both ends of the rotor shaft for axial support thereof are magnetic bearing halves that are located on both end walls of the housing. Each of the magnetic bearing halves acts on the annular inner face of the radial impeller with which it is associated. Inner faces of the radial impellers are thus employed as annular faces of sufficient size for each of the two axial magnetic bearing halves, and function as bearing disks for the axial magnetic bearing halves, in that the impellers are partly or wholly ferromagnetic. By means of this preferred design of the invention, the high static and dynamic pressure and pulse axial thrusts to which the radial impellers are subjected are counteracted by a sufficient static and dynamic axial bearing force.

The radial and axial magnetic bearings for the rotor shaft are preferably active magnetic bearings that have a control system that is able to modify the respective bearing forces acting at that moment. Since the position of the rotor shaft can be measured by use of contactless sensors, it is possible to precisely control the rotor shaft bearing during operation of the turbomachine. To protect the active magnetic bearings, in this design of the turbomachine radial backup bearings are provided on the rotor shaft in the region between the bearing journals for the radial magnetic bearings and the radial impellers. These radial backup bearings are usually designed as slide bearings or preferably as roller bearings, for example ball bearings. In addition, for sealing the rotor shaft, rotating components of the shaft seals are mounted between the backup bearings and the radial impellers.

For axial support of the rotor shaft, in one particularly preferred design of the invention, magnetic bearing halves are mounted in this region of the shaft insets for the backup bearings and rotating components of the shaft seals. This design approach reduces the axial space requirements compared to known turbomachines, and avoids additional extension of the shaft projection. In this design of the invention, the shaft overhang between the radial magnetic bearing and the radial impeller is dimensioned in such a way that the shaft seal and the backup bearing have just enough space on the rotor shaft, in the axial direction thereof.

In another preferred design of the invention the turbomachine is a two-stage compressor of radial design. In this design the electric machine is an electric motor. In addition, the turbomachine may also be designed as a two-stage expansion turbine of centripetal design, with an electric motor that correspondingly operates as a generator. The invention also encompasses a turbomachine having a compression stage and an expansion stage. In this design the electric machine may on the one hand be operated as an electric motor when the required drive output for the compression stage is greater than the shaft output delivered by the expansion stage. On the other hand, the electric machine may also be operated as a generator when the shaft output delivered by the expansion stage is greater than the drive output required for the compression stage. Depending on the particular operating conditions for the compression stage and the expansion stage, the electric machine may be operated as an electric motor or as a generator.

BRIEF DESCRIPTION OF THE DRAWING

The above and other objects, features, and advantages will become more readily apparent from the following description, reference being made to the accompanying drawing whose sole FIGURE is a partly schematic axial section through a turbomachine according to the invention.

SPECIFIC DESCRIPTION

As seen in the drawing a turbomachine 1 in accordance with the invention has a tubular cylindrical housing 2 centered on an axis A and holding an electric machine 3 also centered on the axis A. A rotor shaft 4 is supported in the housing 2 for rotation about the axis A and carries a rotor 3a. One axial end of the rotor shaft 2 carries a radial impeller 5 with axially projecting vanes 5a angled to respective radii of the axis A so that when a fluid axially impinges the impeller 5 the shaft 2 is rotated or, alternately, when the shaft is rotated a fluid in contact with the vanes 5a is moved radially outward. In addition, a magnetic bearing half 6 is provided on an end plate 2a of the housing at least one end of the rotor shaft 4 for axial support of the rotor shaft 4 relative to the housing 2. This magnetic bearing half 6 acts on a planar and axially inwardly directed face 7 of the radial impeller 5.

In addition according to the invention the opposite end of its rotor shaft 4 carries a radial impeller 8 mounted with one-sided support and otherwise identical to the impeller 5. The second end of the rotor shaft 4 is also axially supported on a magnetic bearing half 9 that acts on an inner face 10 of the associated radial impeller 8 and that is carried on an opposite end plate 2b of the housing 2.

The rotor shaft 4 of the illustrated turbomachine 1 is radially supported on magnetic bearings 11 and 12. In this embodiment of the turbomachine 1 the radial magnetic bearings 11 and 12 and the axial magnetic bearing halves 6 and 9 are active magnetic bearings and are operated by a controller 19 by means of which the bearing forces acting at that moment on the magnetic bearings may be controlled. Sensors such as shown at 20 that continuously detect the axial and/or radial position of the rotor shaft 4 relative to the housing, thus allowing the rotor shaft bearing to be precisely adjusted. Backup bearings 13 and 14 are provided between the radial impellers 5 and 8 and the radial magnetic bearings 11 and 12 to protect the active magnetic bearings when the system is deenergized. These backup bearings 13 and 14 are roller bearings, preferably ball bearings having balls produced from a metallic or ceramic material. The axial magnetic bearing halves 6 and 9 are mounted on the impeller-side end walls 2a and 2b of the housing 2 at shaft setbacks 15 and 16 provided for the backup bearings 13 and 14 and also carrying seals 17 and 18. The shaft setbacks 15 and 16 are dimensioned in each case so that the respective shaft seals 17 and 18 and the respective backup bearing 13 and 14 have just enough space.

In the illustrated preferred embodiment of the invention, the turbomachine 1 may be a two-stage radial-action compressor. The electric machine 3 in the illustrated design is an electric motor having the rotor 3a fixed on the shaft 4 and a tubular stator coil 3b fixed outside it in the housing 2. The turbomachine 1 may also be designed as a two-stage expansion turbine of centripetal design, the electric motor 3 correspondingly being operated as a generator. The illustrated embodiment of the turbomachine 1 according to the invention may also have an expansion turbine stage and a compression turbine stage. In this design the electric machine 3 may on the one hand be operated as an electric motor when the required drive output for the compression stage is greater than the shaft output delivered by the expansion stage. On the other hand, the electric machine 3 may also be operated as a generator when the shaft output delivered by the expansion stage is greater than the drive output required for the compression stage. Depending on the particular operating conditions for the compression stage and the expansion stage for the preferred embodiment of the invention illustrated in the single FIGURE, the electric machine 3 may thus be operated as an electric motor or as a generator.

Thus such a turbomachine 1 can be mounted with modest radial clearance in a cylindrical pipe or conduit along which a liquid or gas flows axially. If the liquid or gas is flowing under pressure, the turbomachine 1 can be operated as a generator. If the motor parts 3a and 3b are powered, the turbomachine can work as an impeller or pump.

I claim:
1. A turbomachine comprising:
a housing defining an axis and having an axially outwardly directed first end wall;
a shaft rotatable about the axis inside the housing and having a first end projecting axially from the housing;
an electric rotor on the shaft;
an electric stator on the housing juxtaposed with the electric rotor;
a radial impeller fixed on the first shaft end outside the housing and having an at least partially magnetic inner face directed axially toward the housing end wall; and a magnetic bearing half including a coil fixed in the housing end wall immediately adjacent and directed at the impeller inner face.

2. The turbomachine defined in claim 1, further comprising magnetic bearings between the housing and the shaft radially supporting the shaft in the housing.

3. The turbomachine defined in claim 2, further comprising mechanical backup bearings between the housing and the shaft supporting the shaft in the housing for rotation about the axis.

4. The turbomachine defined in claim 3, further comprising respective shaft seals between the shaft and the housing axially outward of the backup bearings.

5. The turbomachine defined in claim 1 wherein the shaft has a second end projecting axially from the housing opposite to the first shaft end and the housing has a second end wall axially opposite the first end wall, the turbomachine further comprising:
 a second radial impeller fixed on the second shaft end outside the housing and having an inner face directed axially toward the second housing end wall;
 a second magnetic bearing half fixed on the second housing end wall immediately adjacent and directed at the inner face of the second impeller.

6. The turbomachine defined in claim 5 wherein the second bearing half also includes a coil fixed in the second end wall, the second impeller inner face being at least partially magnetic.

7. The turbomachine defined in claim 6, further comprising a sensor for detecting a relative axial position of the shaft and housing; and
control means connected to the coils and to the sensor for energizing the coils so as to axially center the shaft in the housing.

8. The turbomachine defined in claim 7 wherein the stator is a coil surrounding the rotor.

9. The turbomachine defined in claim 1 wherein the rotor and stator include an electromagnet.

10. The turbomachine defined in claim 1 wherein the impeller has axially directed vanes angled such that, when immersed in a fluid, axial movement of the fluid over the impeller rotates the shaft or rotation of the impeller radially displaces the fluid.

11. A turbomachine comprising:
 a housing defining an axis and having an axially outwardly directed first end wall and a second end wall axially opposite the first end wall;
 a shaft rotatable about the axis inside the housing and having a first end projecting axially through the first end wall from the housing and a second end projecting axially through the second end wall from the housing;
 an electric rotor on the shaft;
 an electric stator on the housing juxtaposed with the electric rotor;
 respective first and second radial impellers fixed on the first and second shaft ends outside the housing and each having an at least partially magnetic inner face directed axially toward the housing end wall;
 respective first and second magnetic bearing halves each including a coil fixed in the first and second housing end walls immediately adjacent and directed at the inner faces of the first and second impellers.

* * * * *